United States Patent
Lahoda et al.

(10) Patent No.: US 10,457,558 B2
(45) Date of Patent: Oct. 29, 2019

(54) METHOD TO PRODUCE URANIUM SILICIDES

(71) Applicant: WESTINGHOUSE ELECTRIC COMPANY LLC, Cranberry Township, PA (US)

(72) Inventors: Edward J. Lahoda, Edgewood, PA (US); Simon Middleburgh, Chester (GB)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/005,928

(22) Filed: Jun. 12, 2018

(65) Prior Publication Data
US 2018/0370808 A1    Dec. 27, 2018

Related U.S. Application Data

(60) Provisional application No. 62/523,302, filed on Jun. 22, 2017.

(51) Int. Cl.
*C01B 33/06* (2006.01)
*C01B 32/928* (2017.01)
*C01G 43/025* (2006.01)

(52) U.S. Cl.
CPC ............ *C01B 33/06* (2013.01); *C01B 32/928* (2017.08); *C01G 43/025* (2013.01); *C01P 2006/80* (2013.01)

(58) Field of Classification Search
None
See application file for complete search history.

(56) References Cited

U.S. PATENT DOCUMENTS

| | | | | |
|---|---|---|---|---|
| 2,448,479 A | * | 8/1948 | Harley | C01B 32/928 423/256 |
| 2,906,598 A | * | 9/1959 | Googin | C01G 43/025 423/261 |
| 3,087,877 A | * | 4/1963 | Goeddel | C04B 35/51 419/15 |
| 3,111,394 A | * | 11/1963 | Weber | B01J 19/28 422/159 |
| 3,168,369 A | | 2/1965 | Reese et al. | |
| 3,179,491 A | * | 4/1965 | Wada | C01F 17/0006 423/261 |

(Continued)

FOREIGN PATENT DOCUMENTS

EP    1985587 A1    10/2008

OTHER PUBLICATIONS

Wang; Developing a High Thermal Conductivity Nuclear Fuel With Silicon Carbide Additives; A Dissertation Presented to the Graduate School of the University of Florida in Partial Fulfillment of the Requirements for the Degree of Doctor of Philosophy; 2008.*

(Continued)

*Primary Examiner* — Guinever S Gregorio
(74) *Attorney, Agent, or Firm* — Joseph C. Spadacene; Westinghouse Electric Company LLC

(57) ABSTRACT

The method described herein may be characterized as reacting uranium dioxide with carbon to produce uranium carbide, and, reacting the uranium carbide with a silane, a silicon halide, a siloxane, or combinations thereof, and excess hydrogen to produce uranium silicide.

39 Claims, 1 Drawing Sheet

(56) References Cited

U.S. PATENT DOCUMENTS

| | | | |
|---|---|---|---|
| 3,235,327 A | | 2/1966 | Blundell et al. |
| 3,259,470 A | * | 7/1966 | Hofmann ................ C04B 35/51 422/159 |
| 3,276,968 A | * | 10/1966 | Ingleby ..................... B01J 2/18 376/411 |
| 3,345,143 A | * | 10/1967 | Murbach ................ C01B 32/90 423/256 |
| 3,714,061 A | * | 1/1973 | Triggiani ............. C01G 43/025 252/635 |
| 3,796,672 A | * | 3/1974 | Dada et al. ............. C01B 13/20 252/636 |
| 3,819,804 A | * | 6/1974 | Hollander ............ C01G 43/025 423/261 |
| 3,842,155 A | * | 10/1974 | Muller et al. ....... C01B 15/0475 423/15 |
| 4,397,824 A | | 8/1983 | Butler et al. |
| 4,830,841 A | | 5/1989 | Urza |
| 4,889,663 A | | 12/1989 | Michel |
| 5,752,158 A | | 5/1998 | Stephenson et al. |
| 5,875,385 A | | 2/1999 | Stephenson et al. |
| 6,136,285 A | | 10/2000 | Feugier |
| 6,656,391 B1 | | 12/2003 | Bonnerot et al. |
| 7,824,640 B1 | | 11/2010 | Lahoda |
| 2008/0025894 A1 | * | 1/2008 | Lahoda ................ C01G 43/025 423/261 |

OTHER PUBLICATIONS

Watanabe et al.; Kinetics on Carbothermic Reduction of $UO_2$+C Powders and Compacts to $UC_2$; Journal of Nuclear Science and Technology; 19(3), pp. 222-230; Mar. 1982.*

* cited by examiner

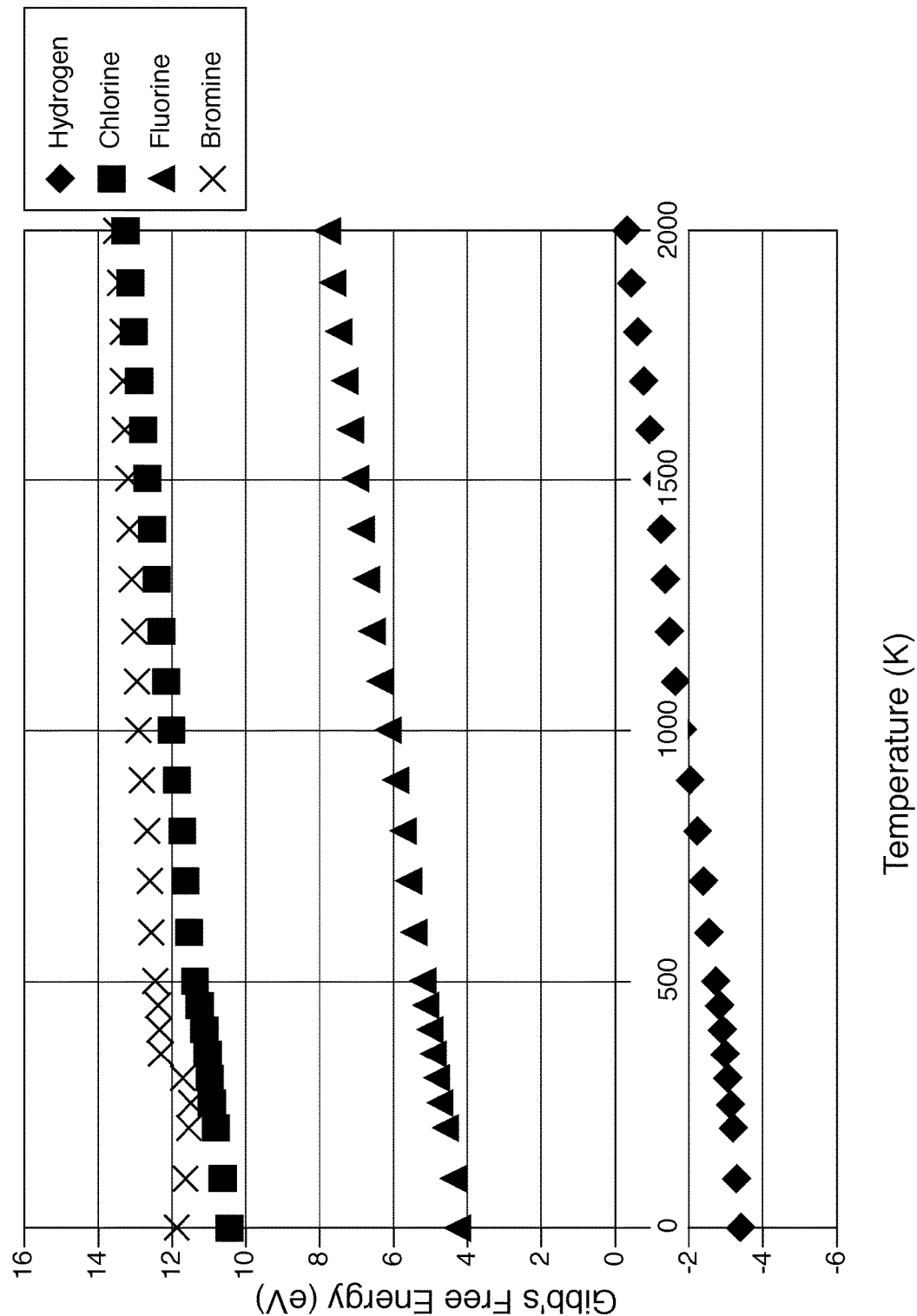

METHOD TO PRODUCE URANIUM SILICIDES

STATEMENT REGARDING GOVERNMENT RIGHTS

This invention was made with government support under Contract No. DE-NE0008222 awarded by the Department of Energy. The U.S. Government has certain rights in this invention.

BACKGROUND OF THE INVENTION

1. Field of the Invention

The present invention relates to methods of manufacturing uranium silicides for use as nuclear fuel and, more particularly, to a process for producing uranium silicides using uranium carbide as an intermediate.

2. Description of the Prior Art

The preparation of commercial nuclear fuels mainly has been by processes which use enriched and depleted uranium (i.e., enriched or depleted in the uranium-235 isotope as compared to the uranium-235 content of naturally occurring uranium ore) feed as $UF_6$. The enriched $UF_6$ is converted to $UO_2$ by processes selected to give the ceramic sinterability needed for the preparation of nuclear fuel pellets.

Early patents issued to Reese et al., U.S. Pat. No. 3,168,369, filed in 1961, and to Blundell et al., U.S. Pat. No. 3,235,327, filed in 1962, described all the basic reactions and general technology required to make uranium dioxide nuclear fuel for nuclear reactors from uranium hexafluoride.

Numerous U.S. patents have been subsequently issued directed towards processes for the conversion of $UF_6$ to uranium oxides. See, for example, U.S. Pat. No. 4,830,841 and the U.S. patents listed therein, which describe procedures for converting $UF_6$ to uranium dioxide in furnaces, rotary kilns, fluidized beds and the like.

Other U.S. patents disclose single-step processes for producing nuclear reactor fuel, such as U.S. Pat. Nos. 4,397,824 and 5,875,385. An exemplary single-step process for producing solid uranium oxide powder is disclosed in U.S. Pat. No. 5,752,158, which describes a single-step Modified Direct Route (MDR) process for producing solid uranium oxide powder and gaseous HF from $UF_6$ by bringing together two gaseous reactant streams, one of the streams comprising $UF_6$ optionally admixed with oxygen as $O_2$, and the second reactant stream comprising a mixture of hydrogen as $H_2$ or as a hydrogen-containing compound and oxygen as an oxygen-containing compound. The gaseous reactant streams are brought together at a temperature and composition such that the $UF_6$ is converted rapidly by flame reaction into readily separable solid uranium oxide and a gaseous HF product.

Additional single-step dry processes for obtaining uranium dioxide powder (i.e., by direct reduction of $UF_6$ into $UO_2$) which include the Intermediate Dry Route process have been widely used and are described in, for example, U.S. Pat. Nos. 4,889,663 and 4,397,824. The powders obtained by the dry conversion process, including water vapor hydrolysis followed by pyrohydrolysis of the uranyl fluoride $UO_2F_2$ obtained, have the advantage of being readily sinterable. The powder produced is very active but hard to handle and produces very weak green pellets. Handling therefore is delicate and rejects are numerous if special care is not exercised.

U.S. Pat. No. 6,656,391 discloses the use of a wet ammonium diuranate process (ADU) to produce both $UO_3$/$U_3O_8$ from both uranyl nitrate hexahydrate (UNH) and $UF_6$. In particular, the $UO_3/U_3O_8$ that is produced from this process then is processed in a calciner to produce $UO_2$. The ADU process produces a stable but only moderately active (i.e., only achieves a final pellet density of about 97.5% on a consistent basis) $UO_2$ powder.

Uranium silicide fuels, such as $U_3Si_2$, are conventionally produced by mixing uranium and silicon metals together and melting them at temperatures greater than 1665° C. $UF_6$ is the most common commercial uranium feedstock. When making $U_3Si_2$, $UF_6$ must first be converted into a uranium metal in a multi-step process which is costly and difficult for large scale manufacturing.

For example, one high temperature process, $$UF_6 + H_2 \rightarrow 2HF + UF_4,$$

generates a very corrosive HF atmosphere. Isolating the uranium in a procedure such as $$UF_4 + 2Mg \rightarrow U + 2MgF_2,$$

relies on a high temperature process with a uranium metal product. The resulting uranium metal is mixed with silicon metal to make $U_3Si_2$, represented by $$3U + 2Si \rightarrow U_3Si_2$$

at temperatures greater than 1652° C. Uranium metal is very dense. Only small quantities of the U metal may be used in any batch because larger quantities can start a uranium fission process. Each of these steps therefore has criticality issues for large scale manufacturing and batch processing.

A safer, more cost effective method is desired.

SUMMARY OF THE INVENTION

The method described herein addresses the problem associated with the use of uranium and silicon metals in the production of uranium silicides.

In various aspects, a method is described herein that comprises forming uranium dioxide, reacting uranium dioxide with a source of carbon to produce uranium carbide, and, reacting uranium carbide with a silicon based reactant comprised of a silane, a silicon halide, a siloxane, and combinations thereof, in the presence of excess hydrogen to produce a uranium silicide.

Uranium dioxide may be formed by a process selected from the group consisting of an ammonium uranyl carbonate process, an ammonium diuranate process, and an integrated dry route process, or any other suitable known process.

The uranium dioxide may be formed from uranium fluoride. In various aspects, the uranium fluoride may be selected from uranium hexaflouride (UF), uranyl fluoride ($UO_2F_2$) and uranium tetrafluoride ($UF_4$).

The method described herein, or one or more steps of the method, in various aspects, may be carried out in a rotary kiln. The step of the method for forming the uranium silicides may be carried out at a temperature not far beyond the reported decomposition temperature of $SiH_4$, for example a temperature greater than about 623 K to 673 K (about 350-400° C.). The temperature for the uranium silicide forming step may, however, range from between about 500 K to 800 K (about 227° C. to 527° C.), and preferably may be between about 500 K and 700 K (about 227° C. and 427° C.). The preceding steps of the method may be carried out at temperatures below the melting point of the reactants, and may, for example, be carried out generally at temperatures below the melting point of the targeted stoichiometry of the targeted uranium silicide.

The targeted uranium silicide may be $U_3Si_2$. However, the ratio of uranium to silicon in the uranium silicon product may be varied by varying the ratio of feed compounds used to form uranium silicide, uranium carbide, and one of silicon hydride and silicon halide.

A homogenization step at high temperatures may be required once the formation of the uranium silicide reaction has been completed to reduce the content of phases with varied stoichiometries compared to the target $U_3Si_2$. This can be carried out at temperatures up to the target material's melting point (e.g., 1665° C. for $U_3Si_2$).

BRIEF DESCRIPTION OF THE DRAWINGS

The characteristics and advantages of the present disclosure may be better understood by reference to the accompanying FIGURE, which provides a graph showing the Gibbs free energy (eV) values of several reactants (H, Cl, F, and Br) over a range of temperatures from 0 to 2000 K.

DESCRIPTION OF THE PREFERRED EMBODIMENTS

As used herein, the singular form of "a", "an", and "the" include the plural references unless the context clearly dictates otherwise.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The term "rotary kiln" or alternatively, "calciner," means a rotating tubular pyrohydrolysis oven, for example, one provided with heater means, powder feed means at an entry end and injector means near the reaction product exit for injecting, for example, a countercurrent flow of one or more of steam, gaseous $H_2O$ and $H_2$ as generally described in U.S. Pat. No. 6,136,285, or other commercially available equivalent ovens.

The method described herein may be characterized as reacting uranium dioxide with carbon to produce uranium carbide, and, reacting the uranium carbide with a silicon based reactant comprised of a silane, a silicon halide, a siloxane, and combinations thereof, and excess hydrogen to produce uranium silicide.

The method may in various aspects be characterized as forming uranium dioxide, reacting uranium dioxide with carbon from any suitable carbon source, such as graphite or carbon black, to produce uranium carbide, and, reacting the uranium carbide with a silicon based reactant in a linear, branched, or cyclic configuration. The silicon based reactant may be selected from a silane (e.g., $SiH_4$, $Si_2H_6$, $Si_3H_8$, $Si_4H_{10}$, $Si_5H_{12}$ or $Si_6H_{14}$), a silicon halide (e.g., $SiF_4$, $SiH_3F$, $Si_2H_5F$, $Si_3H_6Cl_2$, $Si_4H_8B_2$, $Si_5H_8I_4$ or $Si_6H_{10}Cl_4$, and the like), or a siloxane (e.g., $Si_2O$) in the presence of excess hydrogen ($H_2$) to a produce uranium silicide. In various aspects, the silicon based reactant may have the general formula $Si_nX_{2n+2}$, where n is from 1 to 6 and X is selected from the group consisting of hydrogen, halides, and combinations thereof. In other aspects, the silicon based reactant may be in a cyclic configuration having fewer than 2n+2 X molecules.

An exemplary representation of the method may be shown as:

$$UF_6+H_2+2H_2O \rightarrow UO_2+6HF,$$

or any suitable known method for producing uranium dioxide. The conversion of uranium dioxide to uranium carbide may proceed as follows:

$$UO_2+3C \rightarrow UC+2CO$$

or $$UO_2+2C \rightarrow UC+CO_2.$$

The uranium carbide is reacted with a stoichiometric amount of a silicide, in an exemplary reaction that proceeds as follows:

$$3UC+2SiX_4+2X_2 \rightarrow U_3Si_2+3CX_4,$$

wherein X is preferably H, such that the reaction may be represented as follows:

$$3UC+2SiH_4+2H_2 \rightarrow U_3Si_2+3CH_4.$$

X may also be a halide selected from the group consisting of F, Cl, B, and I, or a mixture of H and halide. If X is a halide, the reaction has been thermodynamically determined to be more difficult due to the high Gibbs free energy in the halide systems, as shown in the attached FIGURE.

Suitable known methods for producing uranium oxides include, for example, ammonium uranyl carbonate (AUC), ammonium diuranate (ADU), and integrated dry route (IDR) processes. Those skilled in the art will appreciate that any source of or method of producing uranium dioxide will suffice.

An exemplary ammonium uranyl carbonate (AUC) process may, in various aspects, be a two-step process that proceeds as follows:

$$UF_6+5H_2O+10NH_3+3CO_2 \rightarrow (NH_6)_4(UO_2(CO_3)_3)+6NH_4F$$

$$(NH_4)_4(UO_2(CO_3)_3)+H_2 \rightarrow UO_2+4NH_3+3CO_2+3H_2O.$$

The chemical composition of the AUC precipitates vary according to the C/U ratio of the precipitation solution. A C/U ratio greater than or equal to 7.5 yields a precipitate composition represented by $(NH_4)_4(UO_2(CO_3)_3)$. The $UO_2$ conversion is characterized by the formation of discrete particles of 40-300 μm in size, which permits direct pelletizing.

An exemplary ammonium diuranate (ADU) process may in various aspects proceed by reacting $UF_6$ with water to form a uranyl fluoride solution or uranyl nitrate solution with ammonium hydroxide solution to produce an ADU precipitate. Following calcination of the ADU precipitate in nitrogen and reduction with the steam-hydrogen gas mixture, reaction products are converted to $UO_2$ powders. The reaction may generally be represented as follows:

$$UF_6+2H_2O \text{ (e.g., an aqueous solution of } UF_6) \rightarrow UO_2F_2+4HF,$$

(at about 120° F. (about 48.9° C.))

$$UO_2F_2+2NH_4OH \rightarrow UO_2(NH_4)_2+2HF$$

(at about 70° F. (about 21° C.))

$$UO_2(NH_4)_2+H_2+2H_2O \text{ (e.g., } UO_2(NH_4)_2 \text{ and steam in a hydrogen atmosphere)} \rightarrow UO_2+2NH_4OH$$

(at about 1100° F. (about 593.3° C.))

An integrated dry route (IDR) process changes $UF_6$ into a ceramic grade uranium dioxide ($UO_2$) powder, typically in a single stage, by mixing steam and hydrogen in a kiln, such as, for example, a rotary kiln, to produce $UO_2$ and HF gas. In an exemplary process, uranium hexafluoride gas is blown into a kiln, or calciner, and mixed with steam and excess hydrogen at 1100° F. (about 593.3° C.) at atmospheric pressure. The reaction may be represented generally as follows:

$$UF_6+H_2+H_2O \rightarrow UO_2+6HF.$$

Excess hydrogen remaining after the reaction is burned off and HF gas is captured as an HF solution.

The uranium dioxide produced in any of these or other reactions is in a powder form. The $UO_2$ powder may be combined in a calciner, or rotary kiln, with solid carbon in a hydrogen atmosphere to create a reducing atmosphere. The carbon may be from any suitable carbon source, such as, for example, graphite, carbon black, or other suitable sources of carbon. The uranium dioxide and carbon react to form uranium carbide and either carbon monoxide or carbon dioxide, or combinations of carbon monoxide and carbon dioxide. Excess hydrogen and the carbon monoxide and/or carbon dioxide reaction products may be in gaseous form and are flared off or removed by other suitable means. The uranium carbide reaction product is a solid.

An advantage of uranium carbide is that uranium is highly covalent, with an effective valence of close to zero. Conversion of uranium carbide, for example, to $U_3Si_2$, involves replacing carbon with silicon. Silicon can be introduced in several ways, such as by reacting uranium carbide powder in a calciner with, for example, an excess of silane gas ($SiH_4$) in the presence of excess hydrogen gas ($H_2$). The powder and gases would be rotated in the calciner at a temperature between about 500 to 800 K (about 227° C. to 527° C.), and preferably between 500 and 700 K (about 227° C. and 427° C.) at atmospheric pressure to yield $U_3Si_2$ and methane gas, which may be represented as $$3UC+2SiH_4+2H_2 \rightarrow U_3Si_2+3CH_4.$$

The excess silane and hydrogen drive the reaction to $U_3Si_2$. The methane reaction product can be off-gassed, burned off, or removed by any suitable means.

In various aspects, uranium silicide compounds other than $U_3Si_2$ may be formed by changing the rate of addition of $SiH_4$ and $H_2$ gases to change the ratio of reactants. Examples of other uranium silicides include $USi_{1.78}$, $U_3Si$, $USi$, and $U_3Si_5$. In practice, a combination of the uranium silicides would be produced. Those skilled in the art will appreciate that reactant ratio manipulation can drive the reaction to produce more of a desired product.

Several reaction schemes were studied thermodynamically using silane and several silicon halides. The silane reaction, $3UC+2SiH_4+2H_2$, has a negative Gibbs free energy, as shown by the diamond in the graph of the attached FIGURE. The silicon halide reactions, represented generally by $3UC+2SiX_4+2X_2 \rightarrow U_3Si_2+3CX_4$, where X is selected from the group consisting of Br, Cl, F, and I, shown in the graph of the FIGURE by an X (Br), square (CO, and a triangle (F), have positive Gibbs free energies, so are less desirable reaction schemes than the negative free energy for silane. Iodine is not shown, but would be expected to also have a positive free energy, falling above bromine on the graph.

Although the silane reaction, wherein X in the general formula $Si_nX_{2n+2}$ is H, is preferred, the silicon halide reactions, wherein X may be a halide or both H and a halide, may be useful in removing traces of residual carbon from the $U_3Si_2$, and other uranium silicide reaction products. Reactions using silicon halides would also be carried out in a rotary kiln within the same temperature range and at the same pressure as the reaction using silane. A homogenization step using silicon halides may be carried out after the uranium silicide is formed to remove traces of residual carbon. This can be carried out at temperatures up to the target uranium silicide material's melting point.

The method described herein is much more cost effective than the conventional method that uses silicon metal to produce $U_3Si_2$ and can be carried out in equipment that can operate at temperatures greater than 500° C., but lower than the melting point of the targeted stoichiometry of the target uranium silicide, for example, $U_3Si_2$, $USi_{1.78}$, $U_3Si$, $USi$, $U_3Si_5$, or combinations thereof, thus significantly improving safety by eliminating the need to handle corrosive molten materials.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method comprising:
forming uranium dioxide;
reacting uranium dioxide with carbon to produce uranium carbide; and,
reacting uranium carbide with a silicon based reactant comprised of a silane, a silicon halide, a siloxane, and combinations thereof, in the presence of excess hydrogen to form a uranium silicide product,
wherein uranium dioxide is formed by a process selected from the group consisting of an ammonium uranyl carbonate process, an ammonium diuranate process, and an integrated dry route process.

2. The method recited in claim 1 wherein the silicon based reactant has from 1 to 6 silicon atoms in a linear, branched, or cyclic configuration.

3. The method recited in claim 1 wherein the uranium silicide is $U_3Si_2$.

4. The method recited in claim 1 wherein the ratio of uranium to silicon in the uranium silicide product is varied by the ratio of feed compounds used to form one or more of uranium dioxide, uranium carbide, and the silicon based reactant.

5. The method recited in claim 1 wherein the method is carried out in a rotary kiln.

6. The method recited in claim 1 wherein each step is carried out at temperatures below the melting point of reactants contributing to the targeted stoichiometry of uranium silicide.

7. The method recited in claim 1 further comprising homogenizing the uranium silicide product at a temperature above the temperature at which the formation of the uranium silicide is carried out and below the melting temperature of the uranium silicide.

8. The method recited in claim 1 wherein the silicon based reactant has the general formula $Si_nX_{2n+2}$, where n is an integer from 1 to 6 and X is selected from the group consisting of hydrogen, halides, and combinations thereof.

9. A method comprising:
forming uranium dioxide;
reacting uranium dioxide with carbon to produce uranium carbide; and,
reacting uranium carbide with a silicon based reactant comprised of a silane, a silicon, halide, a siloxane, and combinations thereof, in the presence of excess hydrogen to form a uranium silicide product;
wherein the silicon based reactant has the general formula $Si_nX_{2n+2}$, where n is an integer from 1 to 6 and X is selected from the group consisting of hydrogen, halides, and combinations thereof.

10. The method recited in claim 9 wherein uranium dioxide is formed from a uranium fluoride.

11. The method recited in claim 10 wherein the uranium fluoride is selected from uranium hexaflouride ($UF_6$), uranyl fluoride ($UO_2F_2$) and uranium tetrafluoride ($UF_4$).

12. The method recited in claim 9 wherein the silicon based reactant has from 1 to 6 silicon atoms in a linear, branched, or cyclic configuration.

13. The method recited in claim 9 wherein the uranium silicide is $U_3Si_2$.

14. The method recited in claim 9 wherein the ratio of uranium to silicon in the uranium silicide product is varied by the ratio of feed compounds used to form one or more of uranium dioxide, uranium carbide, and the silicon based reactant.

15. The method recited in claim 9 wherein each step is carried out at temperatures below the melting point of reactants contributing to the targeted stoichiometry of uranium silicide.

16. The method recited in claim 9 further comprising homogenizing the uranium silicide product at a temperature above the temperature at which the formation of the uranium silicide is carried out and below the melting temperature of the uranium silicide.

17. The method recited in claim 9 wherein uranium dioxide is formed by a process selected from the group consisting of an ammonium uranyl carbonate process, an ammonium diuranate process, and an integrated dry route process.

18. A method comprising:
forming uranium, dioxide;
reacting uranium dioxide with carbon to produce uranium carbide; and,
reacting uranium carbide with a silicon based, reactant comprised of a silane, a silicon halide, a siloxane, and combinations thereof, in the presence of excess hydrogen to form a uranium silicide product;
wherein residual carbon is removed by reacting the residual carbon with a silicon halide and excess halide.

19. The method recited in claim 18 wherein the halide is selected from the group consisting of fluoride, chloride, bromide, iodide, and combinations thereof.

20. The method recited in claim 18 wherein the silicon based reactant has from 1 to 6 silicon atoms in a linear, branched, or cyclic configuration.

21. The method recited in claim 18 wherein the uranium silicide is $U_3Si_2$.

22. The method recited in claim 18 wherein the ratio of uranium to silicon in the uranium silicide product is varied by the ratio of feed compounds used to form one or more of uranium dioxide, uranium carbide, and the silicon based reactant.

23. The method recited in claim 18 wherein each step is carried out at temperatures below the melting point of reactants contributing to the targeted stoichiometry of uranium silicide.

24. The method recited in claim 18 further comprising homogenizing the uranium silicide product at a temperature above the temperature at which the formation of the uranium silicide is carried out and below the melting temperature of the uranium silicide.

25. The method recited in claim 18 wherein uranium dioxide is formed by a process selected from the group consisting of an ammonium uranyl carbonate process, an ammonium diuranate process, and an integrated dry route process.

26. The method recited in claim 18 wherein the silicon based reactant has the general formula $Si_nX_{2n+2}$, where n is an integer from 1 to 6 and X is selected from the group consisting of hydrogen, halides, and combinations thereof.

27. A method comprising:
forming uranium dioxide;
reacting uranium dioxide with carbon to produce uranium carbide; and,
reacting uranium carbide with a silicon based reactant comprised of a silane, a silicon halide, a siloxane, and combinations thereof, in the presence of excess hydrogen to form a uranium silicide product;
wherein the step of forming the uranium silicide is carried out at temperatures between 500 and 800 K.

28. The method recited in claim 27 wherein the silicon based reactant has from 1 to 6 silicon atoms in a linear, branched, or cyclic configuration.

29. The method recited in claim 27 wherein the uranium silicide is $U_3Si_2$.

30. The method recited in claim 27 wherein the ratio of uranium to silicon in the uranium silicide product is varied by the ratio of feed compounds used to form one or more of uranium dioxide, uranium carbide, and the silicon based reactant.

31. The method recited in claim 27 wherein each step is carried out at temperatures below the melting point of reactants contributing to the targeted stoichiometry of uranium silicide.

32. The method recited in claim 27 further comprising homogenizing the uranium silicide product at a temperature above the temperature at which the formation of the uranium silicide is carried out and below the melting temperature of the uranium silicide.

33. The method recited in claim 27 wherein uranium dioxide is formed by a process selected from the group consisting of an ammonium uranyl carbonate process, an ammonium diuranate process, and an integrated dry route process.

34. A method for producing a uranium silicide nuclear fuel comprising a reaction represented by:
(1) $UF_6 + H_2 + 2H_2O \rightarrow UO_2 + 6HF$;
(2) one or both of
  (i) $UO_2 + 3C \rightarrow UC + 2CO$ and
  (ii) $UO_2 + 2C \rightarrow UC + CO_2$;
and,
(3) $3UC + $ one of $2SiX_4$ or $Si_2O + 2X_2 \rightarrow U_3Si_2 + 3CX_4$,
wherein X is, selected from the group consisting of H, Cl, F, Br, and I and combinations thereof.

35. The method recited in claim 34 wherein the process is carried out in a rotary kiln.

36. The method recited in claim 35 wherein the halide is selected from the group consisting of fluoride, chloride, bromide, iodide, and combinations thereof.

37. The method recited in claim 34 wherein step (3) is carried out at temperatures between 500 and 800 K.

38. The method recited in claim 34 wherein, following the third reaction step, residual carbon is removed by reacting the residual carbon with a silicon halide and excess halide.

39. The method recited in claim 34 further comprising, homogenizing the uranium silicide product at a temperature below the melting temperature of the uranium silicide product.

* * * * *